United States Patent [19]
Alley

[11] 3,786,972
[45] Jan. 22, 1974

[54] COMBINATION PANNIER BAG, VALISE AND BACK PACK

[76] Inventor: Hartley R. Alley, 970 Gillaspie Dr., Boulder, Colo. 80302

[22] Filed: Dec. 27, 1971

[21] Appl. No.: 212,060

[52] U.S. Cl............... 224/31, 224/32 A, 224/9, 224/44, 224/46
[51] Int. Cl............................................. B62j 9/00
[58] Field of Search... 224/43, 46 R, 36, 32, 31, 47, 224/44, 37, 38; 190/60, 42; 150/1; 248/214, 215

[56] References Cited
UNITED STATES PATENTS

| | | | |
|---|---|---|---|
| 2,979,098 | 4/1961 | Greaves | 224/43 |
| 299,609 | 6/1884 | Wood | 224/43 |

FOREIGN PATENTS OR APPLICATIONS

| | | | |
|---|---|---|---|
| 72,923 | 12/1947 | Norway | 224/43 |
| 983,806 | 3/1949 | France | 224/43 |
| 580,343 | 9/1946 | Great Britain | 224/43 |
| 188,146 | 11/1922 | Great Britain | 190/60 |

Primary Examiner—Gerald M. Forlenza
Assistant Examiner—Kenneth Noland
Attorney, Agent, or Firm—Anderson et al.

[57] ABSTRACT

This invention relates to a pair of stiff-backed compartmentalized fabric bags having marginal fasteners for use in releasably connecting the bags together in back-to-back relation so as to form a unitary valise and, in addition, a three-hook harness subassembly on the back of each bag by means of which they can either be hung on opposite sides of a rear fender luggage carrier of a bicycle to form pannier bags or, alternatively, fastened in stacked superimposed relation on a pack frame to form a back pack.

3 Claims, 6 Drawing Figures

INVENTOR
HARTLEY R. ALLEY
BY
ATTORNEYS

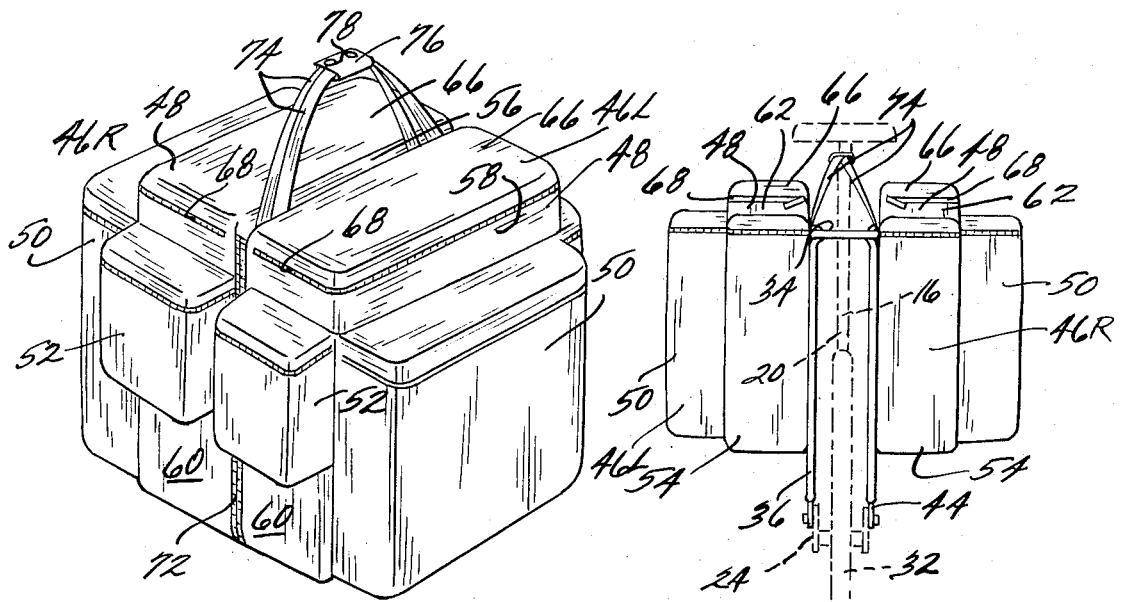
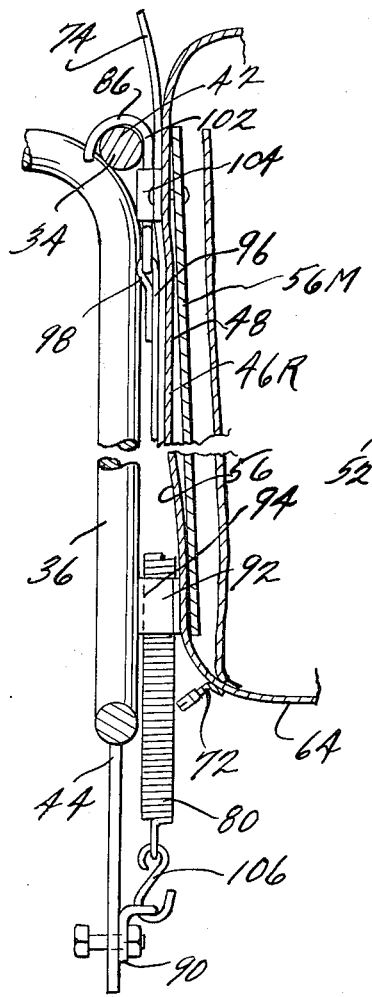
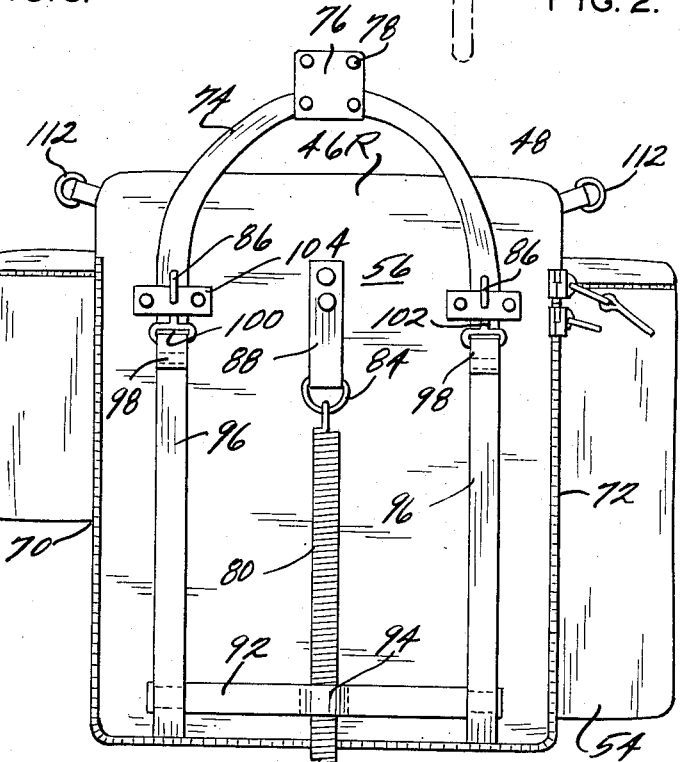
FIG. 3.
FIG. 2.
FIG. 5.
FIG. 4.
INVENTOR
HARTLEY R. ALLEY
BY
ATTORNEYS

COMBINATION PANNIER BAG, VALISE AND BACK PACK

The recent ecological revolution and, more specifically, the increased emphasis on the reduction of air pollution has brought various nonpolluting modes of transportation into increased prominance such as, for example, hiking and cycling. Both of the aforementioned modes of transportation demand some sort of sachel for carrying items needed on the longer trips, especially those lasting several days. While sachels of various types are available, one that is suitable as a hand bag or a back pack is unsuitable for use as a pannier and vice versa; yet, a touring cyclist finds frequent need to remove his pannier bags from the bicycle and carry them "suitcase fashion" by a handle or, perhaps, on a pack frame while hiking into areas that are accessible only on foot.

Also, the present pannier bags leave much to be desired in the way in which they attach to the rear luggage carrier of a bicycle. Most of them are held on by buckled straps and the like which result in a semi-permanent installation, or at least one that does not encourage frequent removal. Furthermore, once the pannier bags are off the bicycle, there is no convenient way to carry them either by one's side in the manner of a suitcase or on the back as a pack.

The conventional pannier bags are oftentimes difficult to adjust to a particular bicycle carrier and, if improperly mounted, they can slip and shift about causing an uneven load distribution along with a certain amount of inconvenience to the cyclist. By way of contrast, the pannier bags forming the subject matter of the present invention are attached almost instantly to any of the common types of rear wheel luggage carriers for bicycles regardless of size and the spring-biased harness keeps them from shifting relative thereto. Also if, perchance, one of the two bags should shake loose of the carrier, it cannot drop off and become lost as it is securely attached to its companion bag over the top of the carrier by the flap carried by one handle that is looped around the other and releasably fastened by snaps or the like.

The same bags that fasten to the luggage carrier in back-to-back spaced relation on opposite sides of the rear wheel can be used in stacked superimposed relation or individually on a pack frame by fastening the three-hook harness to a pair of the vertically spaced cross frame elements of the latter in place of a custom-made back pack. The adjustability of the three-hook harness made possible by the tension spring on the third hook easily adapts the bag to different cross frame element spacings. In fact, the third hook at the bottom of the harness on the top bag and the horizontally spaced pair of hooks at the top of the harness on the bottom bag can easily be fastened to the same cross frame member.

Certainly one of the most significant features of the instant invention is the marginal two-part fastener which enables the two bags to be connected together in back-to-back contacting relation so as to form a unitary valise or sachel equipped with its own carrying handle. All of the compartments in both bags remain fully accessible to the user and one needn't remove or rearrange the contents thereof when shifting from a particular mode of use to another. The three-hook harness subassemblies on the backs of both bags are securely encased within a pocket therebetween defined by the marginal fastener so that the components thereof cannot get lost.

It is, therefore, the principal object of the present invention to provide a combination pannier bag, valise and back pack.

A second objective of the invention is to provide a pair of pannier bags for use on the rear luggage carrier of a bicycle that can be fastened together to form a unitary sachel.

Another object of the invention herein disclosed and claimed is the provision of a compartmented fabric bag having a novel adjustable three-hook harness subassembly on the back thereof.

Still another objective of the within-described invention is to provide pannier bags that can be attached singly or in superimposed stacked relation to a conventional tubular pack frame in place of a custom-made pack.

An additional object is to provide a bicycle pannier bag which includes specially-designed side pockets formed to leave a clear path for the swing of the cyclist's foot as it comes around on the upstroke of the pedaling cycle.

Further objects are to provide cyclists pannier bags which are rugged yet lightweight, versatile, weatherproof, easy to make, relatively inexpensive, convenient to use and decorative in appearance.

Other objects will be in part apparent and in part pointed out specifically hereinafter in connection with the description of the drawings that follows, and in which:

FIG. 2 is a rear elevation of the assembly shown in FIG. 1 but to a reduced scale and with both bags of the pair in place;

FIG. 3 is a perspective view looking down at an angle upon the bags after they have been removed from the bicycle or pack frame and fastened together in back-to-back relation to form a sachel or valise;

FIG. 4 is a rear elevation of one of the bags to an enlarged scale;

Figure 6:
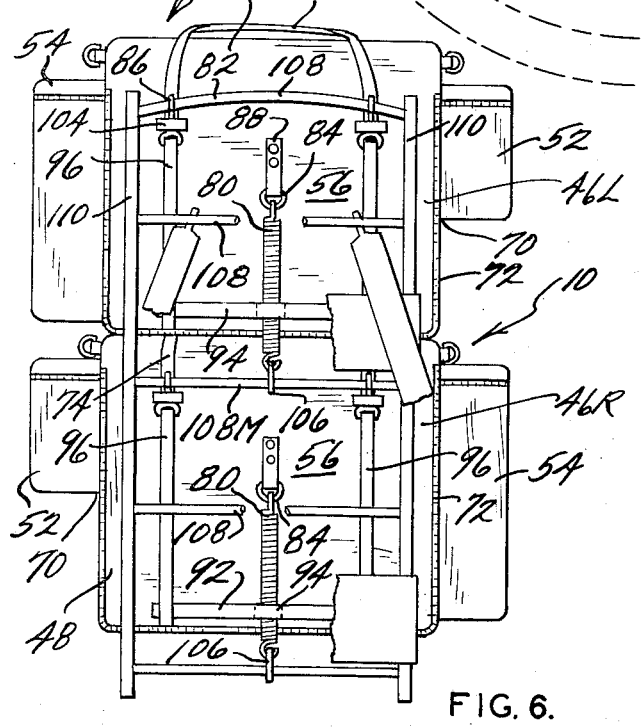

FIG. 5 is a fragmentary vertical to the same scale as FIG. 4 illustrating the manner in which the three-hook harness subassembly releasably fastens onto the luggage carrier; and, FIG. 6 is an elevation view looking at the front of a pack frame showing the manner in which the bags are fastened to the rear thereof, portions of the frame and shoulder harness for the latter having been broken away to better reveal the bag-mounting harness.

Figure 1:
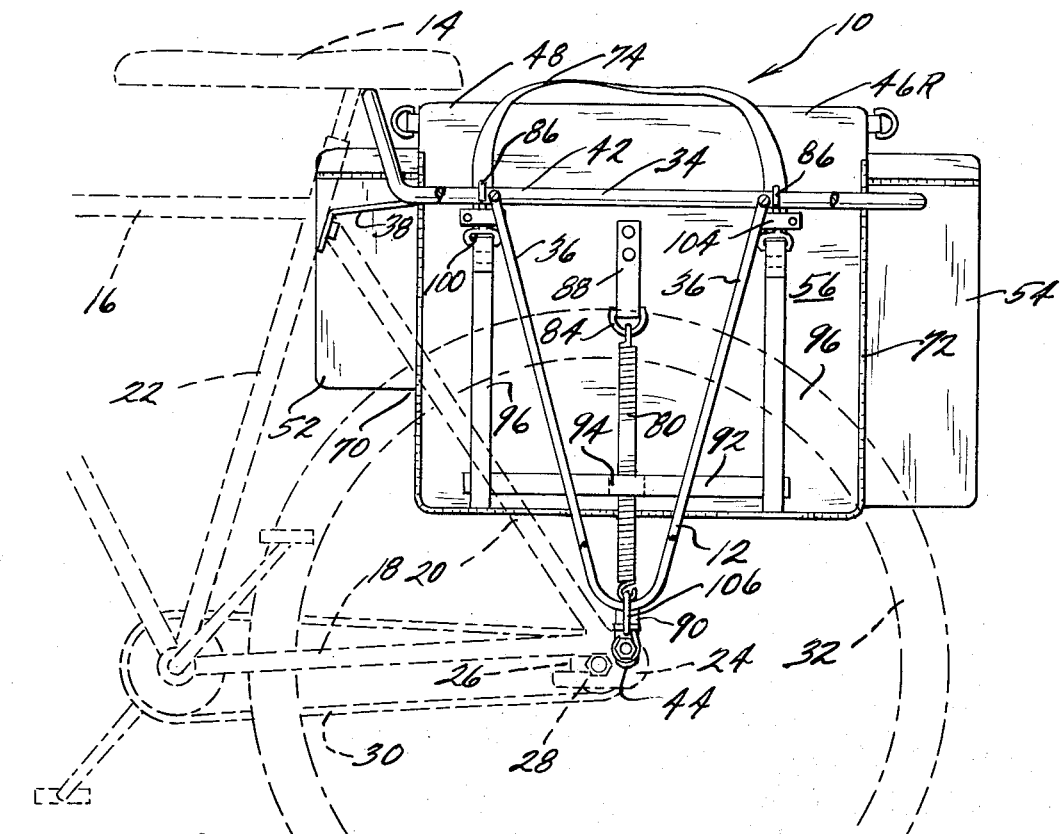
FIG. 1 is an elevational view showing one of the pannier bags fastened in place on the rear wheel luggage carrier for a bicycle, portions of the latter having been broken away to better reveal the construction while the bicycle itself has been shown in broken lines.

Referring next to the drawings for a detailed description of the present invention and, initially, to FIGS. 1-3 for this purpose, reference numeral 10 has been chosen to represent the pannier bags in their entirety while numeral 12 designates the bicycle luggage carrier upon which they are customarily carried while touring. Numeral 14 identifies a bicycle shown in phantom lines in FIGS. 1 and 2 which is of the conventional two-wheeled variety wherein the frame 16 includes means for journalling the rear wheel consisting of a transversely-spaced pair of substantially horizontal frame elements 18 joined at their rear extremities to a pair of upwardly and forwardly ranging diagonal struts 20, all of which attach to vertically disposed frame member 22. The juncture 24 between the struts and horizontal elements customarily includes a forwardly opening notch 26 into which the rear wheel axle 28 is fastened so as to be able to vary the slack in sprocket chain 30 as well as swing the wheel 32 from side-to-side so that it does not rub the frame.

It is not uncommon to find bicycle frames of the type shown provided with an auxiliary opening in the juncture 24 to be used for the purpose of mounting accessories such as the luggage carrier 12. In instances where no such auxiliary opening is provided in the frame, most rear wheel accessories such as that shown can be mounted directly onto the rear axle.

Luggage carrier 12 is most clearly revealed in FIGS. 1, 2 and 5 to which reference will now be made and it is intended as being representative of many different types and styles of luggage carriers commercially available to the cyclist. Common to such carriers is a horizontal platform 34 supported above the rear wheel and braces 36 extending down along opposite sides of the latter to the bicycle frame. Customarily, the platform comprises an elongate loop of tubular stock anchored to the bicycle frame at the front end by a suitable mounting bracket 38. Cross frame members 40 bridge the space between the side frame elements 42 of the platform, those shown being formed integral with the braces 36. As illustrated, these braces are V-shaped, one set thereof being located on each side of the wheel and having their upper extremities joined together by the cross frame elements 42 to define a unitary saddle subassembly. The vertex of the angle formed by the V-shaped braces is provided, in the particular form shown, with a flat metal mounting plate 44 that extends downwardly therefrom and is bolted to the juncture 24 of the frame as shown in FIGS. 1 and 2.

The pannier bags 10 forming the subject matter hereof come in sets of two which are mirror-images of one another, the one for the right side having been designated 46R and its companion for the left side 46L. The bags are preferably made from a rip-resistant waterproof fabric of the type widely used for rucksacks, back packs and the like. Each has a main compartment 48 to the outside of which is sewn or otherwise attached a somewhat smaller side pocket 50 together with front and rear pockets 52 and 54 at opposite ends thereof. All of these pockets 50, 52 and 54 have essentially the same shape and, in fact, they differ only in size.

The main compartment 48 has a generally box-like configuration with inside and outside sidewalls 56 and 58, front and rear endwalls 60 and 62, a bottom 64 and a hinged lid or cover 66. Lid 66 is hinged along the inside wall and has a zipper closure 68 extending around the other three vertical walls that provides access to the compartment through the top.

Each of the three pockets 50, 52 and 54 are also box-like and, apart from the common inside wall they share with the main compartment they also include an outside sidewall, endwalls, a bottom and a hinged lid analogous to those of the latter compartment but differing therefrom in dimension. In each instance, the pocket lids or covers are also hinged along the common wall shared with the main compartment and they are closed by a zipper extending around the other three edges. While on the subject of the zippers for the lids of the main compartment and the pockets, it should be mentioned that in the actual unit, each such zipper is covered and hidden by an overhanging fabric flap (not shown) of conventional construction.

The number, size and arrangement of pockets, if any, that are associated with the main compartment is a matter of individual choice except for the front pocket 52 which cooperates with the latter compartment in a unique way which can best be explained in connection with FIG. 1 to which reference will now be made. Note that the front pocket 52 is considerably shorter than its counterpart 54 on the rear end wall of the main compartment and that it is raised up so as to define a large notch 70 at the lower front corner of each bag. An examination of FIG. 1 will reveal that the heel of a rider would likely not clear the lower front corner of the bag if it were fitted with a full length pocket like pocket 54 on the rear end. It thus becomes important to construct each bag so that the lower front corner is cut away or otherwise shaped to provide unobstructed passage for the rider's heels as his feet move around on the pedals.

The rearwall 62 of one main compartment 48 has half a zipper 72 or one part of same two-part closure bordering the side and bottom margins thereof in a manner most clearly revealed in FIGS. 1, 3 and 5 to which reference will now be made. The main compartment of the companion bag of the pair, of course, carries the other half of the zipper or mating part of the two-part closure. The two bags, when placed in back-to-back mating relation and fastened together as shown in FIG. 3, cooperate with one another to define a unitary multi-compartmented storage unit. Then, when the inverted U-shaped carrying handles 74 fastened to the back of each bag are joined together by means of snap flap 76 carried by one of them, the storage unit becomes a valise. Handles 74 are preferably flexible and are conveniently made of rolled leather or synthetic material. Flap 76 is sewn or otherwise permanently fastened to one of the handles and is of a length to encircle the other preparatory to being fastened to itself by snap fasteners 78.

Briefly with reference to FIG. 2 as it concerns the handles 72, they will be seen to be connected together by means of the flap so as to cooperate with the luggage carrier and define therewith a convenient subassembly for fastening articles frequently needed, like foul weather gear, atop the latter. As such, the handles eliminate the need for straps, elastic lanyards and the like to be used for holding gear on the carrier platform. Regardless of what is stored under the arch formed by the interconnected handles, it becomes instantly available.

These same interconnected handles perform an additional protective function in locking the two bags together in the rare instance where one would shake loose from the luggage carrier. While the bags are held hooked securely to the carrier by a strong tension spring 80 as will be explained presently, there is always the remote possibility that one can become unhooked when traversing rough terrain. If this should occur it cannot drop off, but rather, it will stay fastened to the other bag until it can be remounted.

Now, specific reference will be made to FIGS. 1, 2, 4 and 5 for a description of the inside wall 56 of the main compartment and the appurtenances carried thereby that enable the bags to be releasably fastened to either luggage carrier 12 or a pack frame 82 in a manner to be described presently in connection with FIG. 6. Inside sidewall 56 comprises a double thickness of fabric stitched along both side edges and along the bottom to define an upwardly-opening pocket sized to receive metal plate 56M. This plate is secured permanently to the inside face of the outside wall of the pocket by rivets passing therethrough. These same rivets mount D-ring 84 and downturned hooks 86. In the case of D-ring 84, they pass through looped-over strap 88, the outer layer of double-thickness wall 56 and through plate 56M. They do not, however, pass through the inner layer of the double-thickness wall 56 thus leaving the pocket open to receive maps and the like. The stiffening of the rear wall provided by plate 56M is significant in that it keeps wrinkles from forming when the tension spring 80 pulls the fabric between the hooks downward. If a fold were allowed to occur at this point, it could reach into the wheel where the spokes would engage it. As thus reinforced and stiffened, the foregoing cannot occur.

The D-ring faces downwardly and is mounted approximately midway between the side edges. As far as its vertical position is concerned, it should be well above the bottom edge to leave room for the tension spring coils therebeneath but, other than this, its location relative to the top and bottom edges is not critical. The lower hook of spring 80 is accessible beneath the bottom edge of the bag when the spring is relaxed to facilitate hooking it onto the right angle bracket 90 in the manner shown in FIG. 5. While this position of the spring hook is not especially critical, there is no advantage to be gained by locating it elsewhere either.

The lower end of the spring is held against transverse movement by a length of webbing 92 sewed to the inside wall 56 so as to leave a loop 94 sized to receive and retain the coils of the latter. In the particular form shown, the webbing extends nearly the full width of the main compartment and the ends thereof are joined to vertically extending web straps 96 that extend up along both sides to define a reinforcing harness for the fabric of the bag that is under the greatest strain. The tops of these straps 96 are reversely bent over onto themselves to define loops 98 within which the eyes 100 of hooks 86 are secured as shown adjacent the upper corners of the main compartment spaced on opposite sides of the D-ring. In the particular form illustrated, the ends of the handle pass beneath and terminate behind the stems 102 of hooks 86 thus providing reinforcement for the fabric of the bag at this point as well as a protective cushion to prevent undue wear. The stems of the hooks are held back against these cushions in an upright position by short horizontal retaining straps 104 riveted to the inside wall of the main compartment through plate 58M in the same manner already described in connection with D-ring 58 and as shown in FIG. 5.

In FIGS. 1 and 5 it will be seen that an S-shaped double hook 106 is hooked over the bottom spring hook and, in turn, hooked into angle bracket 90 fastened to the outside of the luggage carrier on the same bolt which is used to fasten the latter to the bicycle frame. Obviously, the lower spring hook could, if desired, be fastened directly to the angle bracket or, alternatively, to the luggage carrier itself by merely drilling an extra hole therein. In any event, once the lower end of the spring is fastened to the bicycle, luggage carrier or bracket as the case may be, the user grasps the handle and lifts the bag to tension the spring until hooks 86 can be hooked over the side frame element 42 on the same side of the platform. The tension in the spring is adequate to hold the bag securely in place and resist all but extreme shock loads without coming loose. No straps need be buckled and the three-hook spring harness removes all slack. All this including fastening of the flap to join the handles together can be accomplished in far less time than it takes to strap even a single bag onto the carrier.

Next, with reference to FIG. 6, the pannier bags of the present invention are shown attached one above the other in stacked relation on the horizontal cross bars 108 of a conventional tubular back pack frame 82. The three-hook harness subassembly fastens to a pair of vertically-spaced horizontal frame members in exactly the same way it does on the luggage carrier. As illustrated, the middle cross bar 108M carries both the bottom hook of the upper bag and the upper hooks of the lower bag. As such, the pannier bags readily convert to a back pack for hiking. In general, most back pack frames will include cross bars spaced one above the other in much the same manner as illustrated but, if not, whatever structure is present between the uprights 110 can usually be adapted to accept the hooks of the harness with a minimal amount of structural alteration being required, certainly nothing approaching the exercise of invention.

Finally, in FIG. 4 it will be seen that another pair of D-rings 112 are located at the upper inside corners of the main compartment. A plain shoulder strap (not shown) can be secured to these D-rings so that the bag can be carried on the shoulder in the manner of a purse.

What is claimed is:

1. The pannier bags which comprise: means shaped to define a pair of independent storage compartments having compatible wall surfaces positionable in opposed face-to-face relation; a hanger subassembly carried on said compatible wall surfaces adapted upon actuation to releasably hang each compartment independent of the other between spaced elements of a supporting frame; said hanger subassembly including a dependent hold-down hook normally hanging below the bottom of the bags in its retracted position; handle-forming means attached to the upper marginal portion of at least one compatible wall surface intermediate the ends thereof; and, a zipper-type fastener attached to the marginal areas along both sides and across the bottom of the compatible wall surfaces cooperating therewith in fastened condition to define an upwardly-opening pocket effective to retain the hanger subassemblies carried by the latter while preventing same from hanging or dropping out through the open bottom, said fastener also cooperating in fastened condition with the compartments and handle-forming means to define a unitary valise-type carrying case.

2. The pannier bags which comprise: means shaped to define a pair of independent storage compartments having compatible wall surfaces positionable in opposed face-to-face relation; a hanger subassembly carried on said compatible wall surfaces adapted upon actuation to releasably hang each compartment independent of the other between spaced elements of a supporting frame, said hanger subassemblies including a pair of downturned hook-forming means arranged in longitudinally-spaced relation along the top of each compatible wall surface, a coiled tension spring attached to said wall surfaces between the downturned hook-opening means, and a third upturned hook suspended from the lower end of said spring beneath the downturned hook-forming means for movement relative thereto; guide means attached to the compatible wall surface defining an upwardly-directed channel positioned to receive the spring and prevent same from moving from side-to-side while permitting it to move freely up and down; and, fastener means carried by adjoining marginal portions of the compatible wall surfaces adapted upon actuation to connect said compartments together to form a unitary assembly.

3. The pannier bags as set forth in claim 2 in which: the guide means comprises a length of strap secured to the compatible wall surface in position to bridge the spring intermediate the ends thereof.

* * * * *